United States Patent
Prabhakar

(10) Patent No.: US 11,538,218 B2
(45) Date of Patent: Dec. 27, 2022

(54) SYSTEM AND METHOD FOR THREE-DIMENSIONAL REPRODUCTION OF AN OFF-ROAD VEHICLE

(71) Applicant: Toyota Motor Engineering & Manufacturing North America, Inc., Plano, TX (US)

(72) Inventor: Varun J. Prabhakar, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/919,688

(22) Filed: Jul. 2, 2020

(65) Prior Publication Data

US 2022/0005267 A1   Jan. 6, 2022

(51) Int. Cl.
*G06T 17/05*   (2011.01)

(52) U.S. Cl.
CPC .................... *G06T 17/05* (2013.01)

(58) Field of Classification Search
None
See application file for complete search history.

(56) References Cited

U.S. PATENT DOCUMENTS

| | | | | |
|---|---|---|---|---|
| 5,995,903 A * | 11/1999 | Smith | ............. | G01C 21/00 340/995.26 |
| 6,356,837 B1 * | 3/2002 | Yokota | ............. | G01C 21/34 701/411 |
| 7,003,397 B2 * | 2/2006 | Yokota | ............. | G01C 21/26 340/990 |
| 9,644,969 B2 * | 5/2017 | Koenig | ............. | H04L 63/102 725/127 |
| 10,718,618 B2 * | 7/2020 | Bitan | ............. | G01C 21/00 340/995.26 |
| 2002/0140562 A1 * | 10/2002 | Gutta | ............. | G08G 1/166 348/148 |
| 2003/0153374 A1 * | 8/2003 | Gilmore | ............. | G07F 17/3276 463/6 |
| 2004/0219980 A1 * | 11/2004 | Bassett | ............. | A63F 13/5252 463/33 |
| 2004/0220730 A1 * | 11/2004 | Chen | ............. | G01C 21/3407 701/414 |
| 2005/0038595 A1 * | 2/2005 | Yokota | ............. | G01C 21/26 701/454 |
| 2012/0311654 A1 * | 12/2012 | Dougherty, III | ...... | H04L 63/102 725/127 |
| 2014/0244110 A1 * | 8/2014 | Tharaldson | ............. | G06Q 50/01 701/36 |

(Continued)

FOREIGN PATENT DOCUMENTS

JP   2004-333466 A   11/2004

*Primary Examiner* — Kent W Chang
*Assistant Examiner* — Jonathan M Cofino
(74) *Attorney, Agent, or Firm* — Oblon, McClelland, Maier & Neustadt, L.L.P.

(57) ABSTRACT

A system for a three-dimensional reproduction of an off-road vehicle can include camera modules, sensors, interface circuitry, processing circuitry, and memory; the sensor can collect vehicle data and map data; the processing circuitry can adjust the vehicle data and the map data; the processing circuitry can graphically reproduce the off-road vehicle by the adjusted vehicle data and the adjusted map data, and the reproduction is in a three-dimensional representation.

17 Claims, 5 Drawing Sheets

(56) References Cited

U.S. PATENT DOCUMENTS

| | | | |
|---|---|---|---|
| 2016/0003621 A1* | 1/2016 | Koenig | G06F 3/04845 |
| | | | 701/31.4 |
| 2017/0230795 A1* | 8/2017 | Rentz | G06Q 10/06311 |
| 2018/0058858 A1* | 3/2018 | Bitan | B62J 45/416 |
| 2020/0216133 A1* | 7/2020 | Rafferty | B62J 45/416 |

* cited by examiner

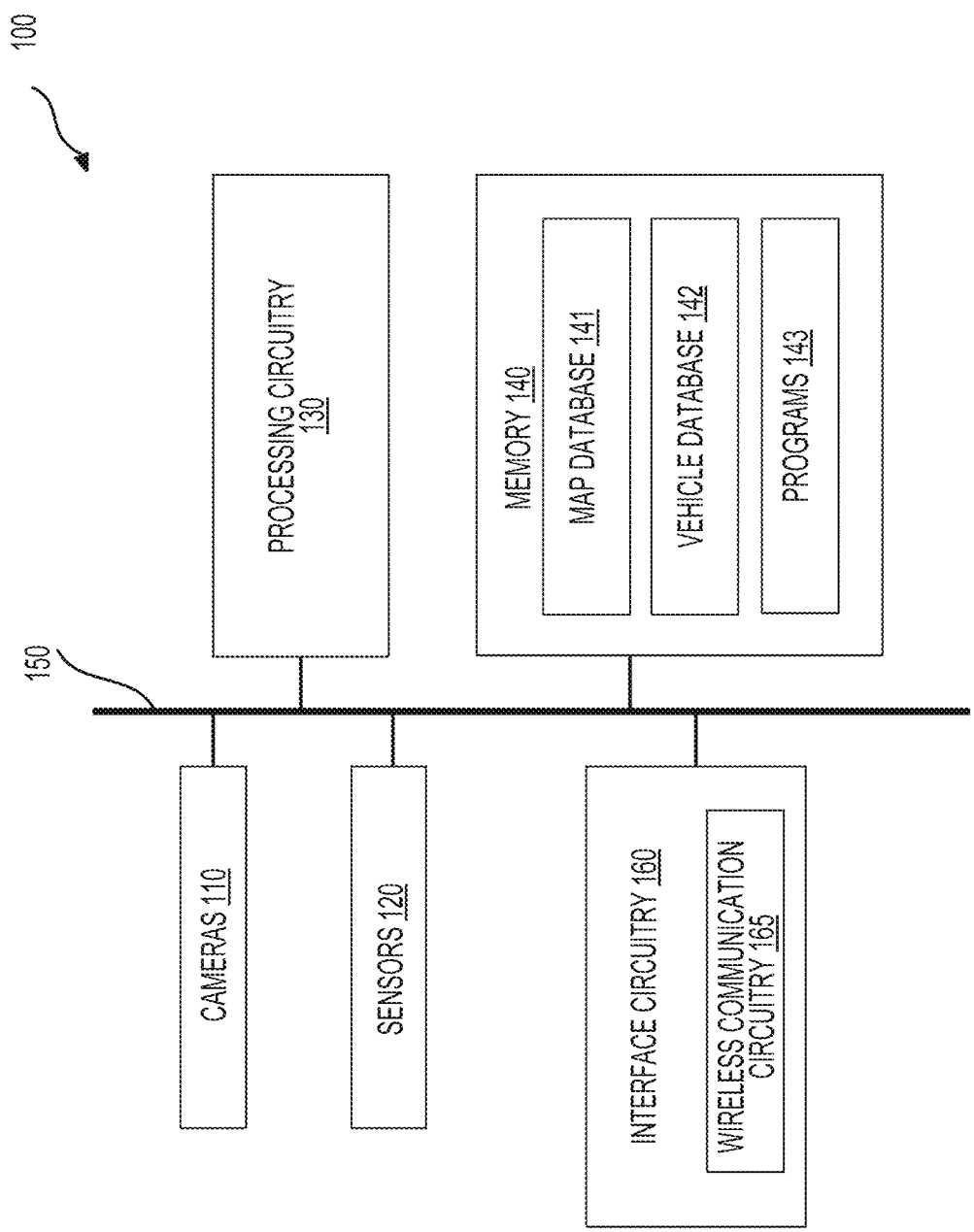

SYSTEM AND METHOD FOR THREE-DIMENSIONAL REPRODUCTION OF AN OFF-ROAD VEHICLE

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. Pat. No. 9,644,969 B2 to Koenig et al. describes an interactive system for use in connection with recreational vehicle usage includes a server system, including an off-road trail database containing trail data, trail condition information, and points-of-interest information, as well as a mapping system accessible by any of a plurality of riders, allowing a rider to create a route based on the data in the off-road trip database. In particular, the invention is directed to aggregation of user feedback regarding trail information and points-of-interest data, club information regarding trail conditions, and weather, hazard, and vehicle data to enrich the rider experience.

SUMMARY

According to an embodiment of the present disclosure, a system and a method for a three-dimensional reproduction of an off-road vehicle are provided. The system can include camera modules, sensors, interface circuitry, processing circuitry, and memory. The sensor can collect vehicle data and map data. The processing circuitry can adjust the vehicle data and the map data. The processing circuitry can graphically reproduce the off-road vehicle by the adjusted vehicle data and the adjusted map data, and the reproduction is in a three-dimensional representation. The processing circuitry can share the reproduction to a threshold amount of users. The processing circuitry can share the reproduction to one or more users in a distance less than a threshold amount of length from a location of the first off-road vehicle.

In an example, the processing circuitry is further configured to store the collected vehicle data and the collected map data for a set amount of time, the set amount of time being defined by a driver in the first off-road vehicle.

In an example, the processing circuitry is configured to provide the reproduction to a driver of a second vehicle.

In an example, the driver of the second vehicle observes a first performance of the first off-road vehicle based on the reproduction being in the three-dimensional representation.

In an example, the driver of the second vehicle compares the first performance of the first off-road vehicle with a second performance of the second vehicle based on the reproduction.

In an example, the vehicle data includes at least one of: a vehicle speed, a wheel speed, a yaw angle, a tilt angle, a compass heading, an elevation, an altitude, a LIDAR data, a sonar data, or GPS coordinates information.

In an example, the vehicle data further includes external data, the external data including at least one of: temperature, humidity, or air quality.

In an example, the map data includes at least one of: a road image or a map image.

In an example, the vehicle data further includes data collected by one or more sensors of passengers in the first off-road vehicle.

In an example, the threshold amount of users is defined by a driver of the first off-road vehicle.

According to an embodiment of the present disclosure, there is provided a non-transitory computer readable storage medium having instructions stored thereon that when executed by processing circuitry causes the processing circuitry to perform the method.

BRIEF DESCRIPTION OF THE DRAWINGS

Various embodiments of this disclosure that are proposed as examples will be described in detail with reference to the following figures, wherein like numerals reference like elements, and wherein:

FIG. 1 is a schematic of an exemplary system according to an embodiment of the disclosure;

DETAILED DESCRIPTION

Figure 2A:
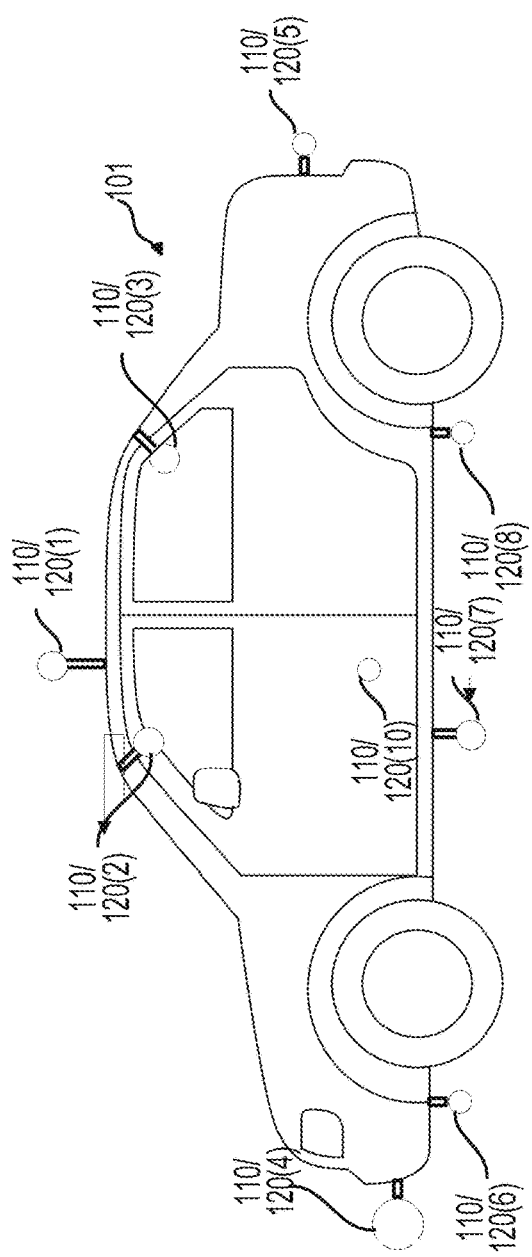
FIGS. 2A-2B show examples of camera modules and sensors in a vehicle according to an embodiment of the disclosure.

A system can include camera modules, sensors, interface circuitry, processing circuitry, and memory. The sensor can collect vehicle data and map data. The sensor can collect data such as a surrounding environment of a first vehicle (e.g., road condition, vehicle speed, etc.). The processing circuitry can adjust the vehicle data and the map data. The processing circuitry can graphically reproduce the off-road vehicle by the adjusted vehicle data and the adjusted map data, and the reproduction is in a three-dimensional representation.

In an example, the processing circuitry can be further configured to store the collected vehicle data and the collected map data for a set amount of time, the set amount of time being defined by a driver in the first off-road vehicle. The processing circuitry can be configured to provide the reproduction to a driver of a second vehicle. The driver of the second vehicle can observe a first performance of the first off-road vehicle based on the reproduction being in the three-dimensional representation. The driver of the second vehicle can compare the first performance of the first off-road vehicle with a second performance of the second vehicle based on the reproduction.

In some embodiments, the driver of the second vehicle may use the collected vehicle data and the collected map data to determine whether to travel along a same path as the first vehicle. For example, if the driver of the second vehicle knows that there is an event on the path where the first vehicle traveled, the driver of the second vehicle may decide to detour to avoid the traffic nearby the event.

In an example, the vehicle data includes at least one of: a vehicle speed, a wheel speed, a yaw angle, a tilt angle, a compass heading, an elevation, an altitude, a LIDAR data, a sonar data, or GPS coordinates information.

In an example, the vehicle data can further include external data, the external data including at least one of: temperature, humidity, or air quality. The vehicle data may also include road information. The road information can be associated with events, such as an accident, a criminal event, a school event, a construction, a celebration, a sport event, and/or the like. The map data can include at least one of: a road image or a map image. The vehicle data can further include data collected by one or more sensors of passengers in the first off-road vehicle.

In an example, the processing circuitry can be further sharing the reproduction to a threshold amount of users, the threshold being defined by a driver of the first off-road vehicle. The processing circuitry can be further sharing the reproduction to one or more users in a distance less than a threshold amount of length from a location of the first off-road vehicle.

FIG. 1 is a schematic of an exemplary system 100 according to an embodiment of the disclosure. The system 100 can include camera modules 110, sensors 120, processing circuitry 130, memory 140, and interface circuitry 160 that are coupled together, for example, using a bus 150. In an example, such as shown in FIG. 1, the system 100 is a part of the first vehicle 101. The first vehicle can be any suitable vehicle that can move, such as a car, a cart, a train, or the like. Alternatively, certain components (e.g., the camera modules 110 and the sensors 120) of the system 100 can be located in the first vehicle 101 and certain components (e.g., processing circuitry 130) of the system 100 can be located remotely in a server, a cloud, or the like that can communicate with the first vehicle 101 wirelessly.

The camera modules 110 can be any suitable devices that can obtain images or videos. The camera modules 110 can capture different views around the first vehicle 101. The camera modules 110 can be fixed to the first vehicle 101. The camera modules 110 can be detachable, for example, the camera modules 110 can be attached to, removed from, and then reattached to the first vehicle 101. The camera modules 110 can be positioned at any suitable locations of the first vehicle 101. The camera modules 110 can be oriented toward any suitable directions. Accordingly, the camera modules 110 can obtain images or videos to show different portions of the surrounding environment of the first vehicle 101.

In some embodiments, the different portions of the surrounding environment can include a front portion that is in front of the first vehicle 101, a rear portion that is behind the first vehicle 101, a right portion that is to the right of the first vehicle 101, a left portion that is to the left of the first vehicle 101, a bottom portion that shows an under view of the first vehicle 101, a top portion that is above the first vehicle 101, and/or the like. Accordingly, a front view, a rear view, a left view, a right view, a bottom view, and a top view can show the front portion, the rear portion, the left portion, the right portion, the bottom portion, and the top portion of the surrounding environment, respectively. For example, the bottom view can show a tire, a pothole beneath the first vehicle 101, or the like. Different portions, such as the left portion and the bottom portion, can overlap. Additional views (e.g., a right-front view, a top-left view) can be obtained by adjusting an orientation of a camera module, by combining multiple camera views, and thus show corresponding portions of the surrounding environment. An orientation of a camera module can be adjusted such that the camera module can show different portions using different orientations.

Each of the camera modules 110 can be configured to have one or more field of views (FOVs) of the surrounding environment, for example, by adjusting a focal length of the respective camera module 110 or by including multiple cameras having different FOVs in the camera module 110. Accordingly, the first camera views can include multiple FOVs of the surrounding environment.

In general, the camera modules 110 can include taking different views and/or different FOVs of the surrounding environment. In an example, the images can include the front view, the right-front view, the front bird-eye view (i.e., the front view with the bird-eye FOV), the normal left-front view (i.e., the left-front view with the normal FOV), and/or the like.

The sensors 120 can be a vehicle speed sensor, a wheel speed sensor, a compass heading sensor, an elevation sensor, a LIDAR, a sonar, a GPS location sensor, or the combination thereof. For example, a vehicle speed sensor can provide a speed data of the first vehicle 101. The GPS location sensor can provide one or more GPS coordinates on a map for the first vehicle 101. Therefore, the data collected by sensors 120 can be vehicle speed data, wheel speed data, compass heading data, elevation data, GPS location data, or the combination thereof.

The sensors 120 can further be thermometers, humidity sensors, air quality sensors, or the combination thereof. Therefore, the data collected by the sensors 120 can further include external data such as temperature, humidity, air quality, or the combination thereof.

In an embodiment, the data collected by the camera modules 110 and sensors 120 may be telemetry data. The telemetry data may include vehicle data and map data. The vehicle data can be stored in vehicle database 142 in the memory 140 and the map data can be stored in map database 141 in the memory 140. The telemetry data collected by the camera modules 110 can be derived from one or more camera modules 110 affixed to the first vehicle 101. The telemetry data collected by the camera modules 110 can also be derived from the one or more camera modules 110 taken by passengers in the first vehicle 101.

Figure 2B:
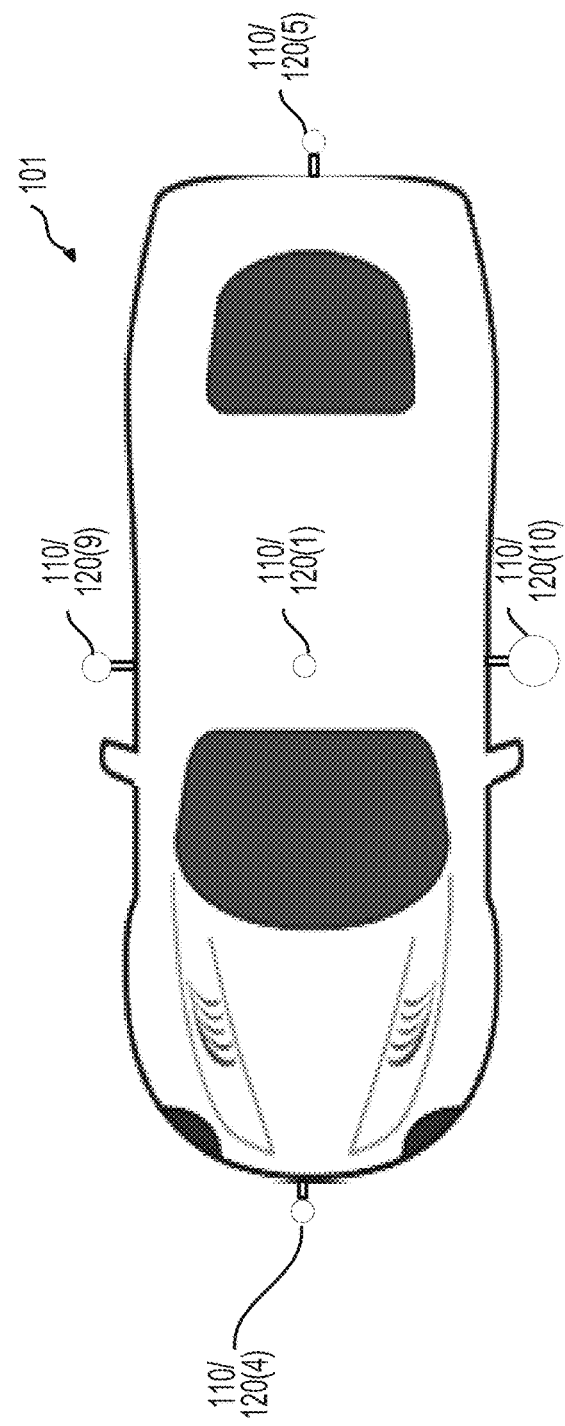

FIGS. 2A-2B show examples of the camera modules 110 (e.g., the camera modules 110(1)-(10)) or sensors 120 (e.g., the sensors 120(1)-(10)), according to an embodiment of the disclosure. For example, the camera module 110(1) is positioned on a top side of the first vehicle 101. The camera modules 110(2)-(3) are positioned on a left side of the first vehicle 101 where the camera module 110(2) is near a front end of the first vehicle 101 and the camera module 110(3) is near a rear end of the first vehicle 101. The camera module 110(4) is positioned on the front end of the first vehicle 101 where the camera module 110(5) is positioned at the rear end of the first vehicle 101. The camera modules 110(6)-(8) are positioned on a bottom side of the first vehicle 101. The camera modules 110(9)-(10) are positioned on the left side and a right side of the first vehicle 101, respectively.

In an example, the sensor 120(1) is positioned on a top side of the first vehicle 101. The sensors 120(2)-(3) are positioned on a left side of the first vehicle 101 where the sensor 120(2) is near a front end of the first vehicle 101 and the sensor 120(3) is near a rear end of the first vehicle 101. The sensor 120(4) is positioned on the front end of the first vehicle 101 where the sensor 120(5) is positioned at the rear end of the first vehicle 101. The sensors 120(6)-(8) are positioned on a bottom side of the first vehicle 101. The sensors 120(9)-(10) are positioned on the left side and a right side of the first vehicle 101, respectively.

In an example, the camera modules 110 and the sensors 120 can be positioned together. The camera module 110(1) and the sensor 120(1) are positioned on a top side of the first vehicle 101. The camera modules 110(2)-(3) and the sensors 120(2)-(3) are positioned on a left side of the first vehicle 101 where the camera module 110(2) and the sensor 120(2) are near a front end of the first vehicle 101 and the camera module 110(3) and the sensor 110(3) are near a rear end of the first vehicle 101. The camera modules 110(4) and the sensor 110(4) are positioned on the front end of the first vehicle 101 where the camera modules 120(5) and the sensor 110(5) are positioned at the rear end of the first vehicle 101. The camera modules 110(6)-(8) and the sensors 110(6)-(8) are positioned on a bottom side of the first vehicle 101. The camera modules 110(9)-(10) and the sensors 110(9)-(10) are positioned on the left side and a right side of the first vehicle 101, respectively.

In an example, the camera module 110(4) is oriented such that the camera module 110(4) can obtain images or videos of the front portion of the surrounding environment. In addition, the sensor 120(4) may or may not be oriented such that the sensor 120(4) can detect more information such as current weather condition, temperature, sound from other vehicles, or a combination thereof.

The descriptions related to the camera module 110(4) and sensor 120(4) can be suitably adapted to other camera modules or sensors. For example, the camera module 110(10) is oriented such that the camera module 110(10) can obtain images or videos of the left portion of the surrounding environment. In addition, the sensors 120(10) may or may not be oriented such that the sensor 120(4) can detect more information such as current weather condition, temperature, sound from other vehicles, or a combination thereof.

In some embodiments, the surrounding environment of the first vehicle 101 can include road conditions, lane markers, road signs, traffic signs, objects including, for example, vehicles, pedestrians, obstacles, on or close to the roads, and the like. The camera modules 110 can capture traffic sign(s) and/or road signs (e.g., for re-routing during an event, such as a marathon), potential hazardous objects such as a pothole, accident debris, a roadkill, and/or the like. In an embodiment, an event occurs near the first vehicle 101, the camera modules 110 can be used to show certain portion(s) of the surrounding environment of the first vehicle 101. For example, the event is a marathon and roads are rerouted, and thus a bird-eye camera view is used to capture more traffic sign(s) for rerouting to help the user of the first vehicle 101. Event(s) can include a recurring event such as a school drop-off and/or pick-up in a school zone, a bus drop-off and/or pick-up at a bus stop along a bus route, a railroad crossing.

The sensors 120 can include any suitable devices that can detect user characteristic(s) (e.g., a face, weight information, a finger print, a voice, a seat selection, a personal portal device) of the user of the first vehicle 101. In an embodiment, the system 100 can also include camera module(s) or sensors (e.g., an internal camera inside the first vehicle 101) configured to obtain images of the face of the user, for example, for face recognition, weight sensor(s) configured to determine the weight information of the user, finger print sensor(s) configured to obtain one or more finger prints of the user, a voice detection sensor, for example, including a microphone that is configured to detect the voice of the user, and/or the like. In addition, the system may include device such as a communication device, e.g., a Bluetooth device such that the user can be determined by pairing the smartphone of the user with the Bluetooth device. The sensors 120, e.g., a key recognition sensor, can also detect a key associated with the user. The sensors 120 can be detachable from the first vehicle 101. The sensors 120 can be attached to the first vehicle 101.

The interface circuitry 160 can be configured to communicate with any suitable device or the user of the first vehicle 101 using any suitable devices and/or communication technologies, such as wired, wireless, fiber optic communication technologies, and any suitable combination thereof. The interface circuitry 160 can include wireless communication circuitry 165 that is configured to receive and transmit data wirelessly from server(s) (e.g., a dedicated server, a cloud including multiple servers), vehicle(s) (e.g., using vehicle-to-vehicle (V2V) communication), infrastructure(s) (e.g., using vehicle-to-infrastructure (V2I) communication), one or more third-parties (e.g., a municipality), map data service(s) (e.g., Google Maps, Waze, Apple Maps), and/or the like. In an example, the wireless communication circuitry 165 can communicate with mobile devices including a mobile phone via any suitable wireless technologies such as IEEE 802.15.1 or Bluetooth. In an example, the wireless communication circuitry 165 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

The interface circuitry 160 can include any suitable individual device or any suitable integration of multiple devices such as touch screens, keyboards, keypads, a mouse, joysticks, microphones, universal series bus (USB) interfaces, optical disk drives, display devices, audio devices (e.g., speakers), and the like. The interface circuitry may include a display device. The display device can be configured to display images/videos captured by one of the camera modules 110.

The interface circuitry 160 can also include a controller that convert data into electrical signals and send the electrical signals to the processing circuitry 130. The interface circuitry 160 can also include a controller that convert electrical signals from the processing circuitry 130 to the data, such as visual signals including text messages used by a display device, audio signals used by a speaker, and the like. For example, the interface circuitry 160 can be configured to output an image on an interactive screen and to receive data generated by a stylus interacting with the interactive screen.

The interface circuitry 160 can be configured to output data, such as vehicle data and map data from the camera modules 110 and the sensors 120 determined by the processing circuitry 130, to the user of the first vehicle 101, and the like.

The interface circuitry 160 can be configured to receive data, such as the vehicle data and the map data described above. The vehicle data can include or indicate driving scenario(s) and/or vehicle characteristic(s) for the vehicle by the respective camera modules 110 or sensors 120 such as time(s), location(s), vehicle type(s), event(s), and/or like.

In an embodiment, the vehicles (e.g., the second vehicle(s)) are different from the first vehicle 101, and the reference vehicle data from camera modules or sensors in the second vehicle are second vehicle data. In an example, the second vehicle data may include first vehicle data from the first vehicle 101. In an example, the user in the second vehicle uses the first vehicle data to compare a vehicle performance (e.g., a vehicle speed in certain road conditions) of the second vehicle with a vehicle performance of the first vehicle. In some embodiments, the user in the first vehicle uses the second vehicle data to compare the vehicle performance of the first vehicle with the vehicle performance of the second vehicle.

The first vehicle data can indicate or include road information of certain events (e.g., an accident, a criminal event, a school event, a construction, a celebration, a sport event) for the first vehicle 101. For example, the events can occur in or in close proximity (e.g., a distance between the first vehicle 101 and the event is within a certain distance threshold) of the first vehicle 101. The user of the first vehicle 101 can also indicate or include the second vehicle data to extract or use the road information of certain events (e.g., an accident, a criminal event, a school event, a construction, a celebration, a sport event) of the second vehicle to understand one or more the events occurring in or in close proximity of the first vehicle 101.

The interface circuitry 160 can be configured to receive routing data for routing the first vehicle 101. In an example, the interface circuitry 160 can receive positioning information from various satellite-based positioning systems such as a global positioning system (GPS), and determine a position of the first vehicle 101. In some examples, the position can be a physical address, the latitude and longitude coordinates of a geographic coordinate system used by satellite-based positioning systems such as a GPS, and the like.

The interface circuitry 160 can receive user identification information, for example, interactively. In an example, the interface circuitry 160 can output inquiries, such as questions and the like related to a user identity. The interface circuitry 160 can be configured to receive data related to the inquiries.

The interface circuitry 160 can receive a user preference of the user of the first vehicle 101. The user preference can indicate a vehicle data history of the user. For example, the vehicle data history may indicate a user preference for the front view for the camera modules instead of the normal view for the camera modules. The vehicle data history may indicate a user habit where the user ignores one or more camera views suggested to the user more frequently than uses the suggested camera views.

The interface circuitry 160 can output the vehicle data (e.g., camera view(s)) determined by the processing circuitry 130 to the user of the first vehicle 101. The interface circuitry 160 can receive an input from the user indicating a user selection. The user can select one or more of the vehicle data (e.g., camera view(s)) via the interface circuitry 160. Alternatively, the user can select none of the vehicle data (e.g., candidate camera view(s)) and indicate vehicle data (e.g., camera view(s)) selected by the user of the first vehicle 101 via the interface circuitry 160.

The processing circuitry 130 can be configured to adjust the vehicle data from the vehicle database 142 and the map data from the map database 141 to reconstruct the first vehicle in three-dimensional form. For example, the processing circuitry 130 can locate map data at the current location of the first vehicle 101 using the global positional system (GPS) data of the first vehicle. After locating the map data, the processing circuitry 130 can reconstruct the first vehicle 101 in a three-dimensional representation by overlapping the located map data and the vehicle data.

In an example, the first vehicle 101 is at a current location and the processing circuitry 130 determines the map data to be used at the current location. In an example, the first vehicle 101 is at the current location and the processing circuitry 130 determines the map data to be used at a next location for the reconstruction of the first vehicle in a three-dimensional representation. When the first vehicle 101 arrives at the next location in a later time, the processing circuitry 130 has the map data at the next location for the reconstruction.

The processing circuitry 130 can obtain the vehicle data directly or can extract the vehicle data from image(s), video(s), or the like. In an example, the processing circuitry 130 receives image(s) from a vehicle. The image(s) can show a portion of a surrounding environment of the vehicle. The processing circuitry 130 can extract vehicle information based on the image(s). For example, the processing circuitry 130 can extract the vehicle information such as vehicle type, vehicle color, and vehicle manufacturer based on the received image(s).

The interface circuitry 160 can receive vehicle data, for example, from the second vehicle(s), from a server configured to collect the data from the second vehicle(s), from a cloud, and/or the like. In an example, the received data include the several second camera image(s) such as a front view image and a rear view image, and the processing circuitry 130 obtains the second camera image(s) from the interface circuitry 160. In an example, the received data include images/videos. The processing circuitry 130 obtains the images/videos, and subsequently determines or extracts the second camera views based on the images/videos.

In some embodiments, the processing circuitry 130 can determine first vehicle reconstruction information of the first vehicle 101 based on the first vehicle data and the first map data, and further the processing circuitry 130 can reconstruct the first vehicle based on the determined location, the first vehicle data, and the first map data. For example, the processing circuitry 130 can determine the first vehicle reconstruction information from the first vehicle data based on one or more of: time(s), location(s), vehicle type(s), and event(s).

In an example shown in FIG. 1, the processing circuitry 130 is part of the first vehicle 101. In an example, the processing circuitry 130 can be implemented in a server, a cloud, or the like, that is remote from the first vehicle 101. The server, the cloud, or the like can communicate wirelessly with the first vehicle 101 regarding the reconstruction, the vehicle data, and the map data, or the like.

The memory 140 is configured to store map data in the map database 141 including road maps. The memory 140 is also configured to store vehicle data in the vehicle database 142, such as a user list including the user information of the multiple users, and programs 143. In an embodiment, information (e.g., data in the map database 141, the vehicle database 142) in the memory 140 can be modified or updated by the processing circuitry 130. The modified information can also be uploaded to a cloud services platform that can provide on-demand delivery of computing power, database storage, and IT resources or shared with other vehicles, for example, using the wireless communication circuitry 165 via V2I and V2V communications, respectively.

The memory 140 can be a non-volatile storage medium. In another embodiment, the memory 140 includes both non-volatile and volatile storage media. In one embodiment, a portion of the memory 140 can be integrated into the processing circuitry 130. The memory 140 can be located remotely and communicate with the processing circuitry 130 via a wireless communication standard using the wireless communication circuitry 165.

In an embodiment, in the FIG. 1, for example, the components are coupled together by a bus architecture including a bus 150. Other suitable interconnection techniques can also be used.

One or more components of the interface circuitry 160, the processing circuitry 130, and the memory 140 can be made by discrete devices or integrated devices. The circuits for one or more of the interface circuitry 160, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

Figure 3:
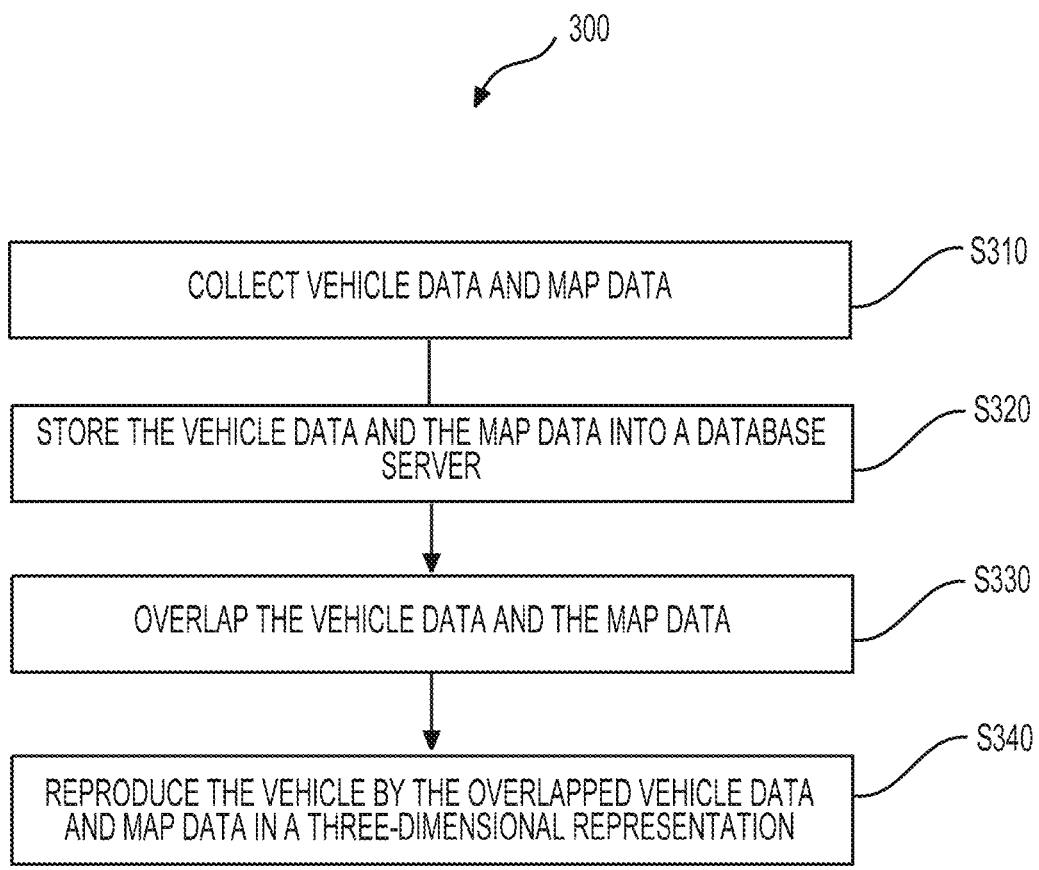
FIG. 3 is a flowchart outlining an exemplary process 300 according to an embodiment of the disclosure.

FIG. 3 is a flowchart outlining an exemplary process 300 according to an embodiment of the disclosure. In an example, the process 300 can be implemented using the system 100 described in FIG. 1. In an embodiment, the process 300 can be used to reproduce a vehicle in a three-dimensional representation from vehicle data and map data. For purposes of brevity, descriptions are given for the first vehicle 101, and the descriptions can be suitably adapted to any suitable vehicle. As described above, the first vehicle 101 can include the camera modules 110 and the sensors 120 configured to have first vehicle data. The first vehicle data can include data from the camera modules 110 and data from the sensors 120. The process 300 starts at S310 and proceeds to S340.

At S310, vehicle data and map data can be collected, for example, via the camera modules 110 and the sensors 120 in FIG. 1, as described above with reference to the first embodiment. The vehicle data and the map data can be from either camera modules 110 or the sensors 120, or a combination thereof. The vehicle data and the map data can be from the first vehicle 101, a driver of the first vehicle 101, or a passenger in the first vehicle 101. As described above, a second vehicle may be within a certain distance threshold (e.g., 50 meters, 1 mile) from the first vehicle 101. Camera modules and sensors in the second vehicle may also collect map data and vehicle data of the second vehicle to the first vehicle in the step S310.

In an embodiment, as described above, the second vehicle(s) can be within the certain distance threshold (e.g., 50 meters, 1 mile) from the first vehicle 101. The second vehicle(s) may have been or are in a first location where the first vehicle 101 is at or will be at. The one or more second vehicles can be used by other users.

In an embodiment, images/videos from the camera modules and sensors are received by the interface circuitry 160, and the multiple second camera views are determined by the processing circuitry 130 from the received images/videos.

At S320, the vehicle data and the map data can be stored into a databased server. For example, the database server can be a vehicle database, a map database, or a combination thereof. As described above, the database can have information including time(s), location(s), vehicle type(s), and event(s) (e.g., construction, a marathon) associated with the vehicle and the surrounding environment of the vehicle. In an example, the surrounding environment of the vehicle may include traffic, road condition, or the like.

At S330, the processing circuitry 130 can overlap the stored vehicle data and the stored map data based on the information extracted from the stored vehicle data and the stored map data. For example, as described above, the processing circuitry 130 may use the current GPS location data of the vehicle to overlap the map data and the vehicle data (e.g., a vehicle image).

At S340, the reproduction of the vehicle is completed by overlapping the stored vehicle data and the stored map data. The reproduction of the vehicle can be in any format, for example, in a three-dimensional representation format.

Different vehicles can have different vehicle data and different map data available in the respective vehicles. The process 300 can be adapted by different vehicle type and different vehicle condition. For example, a second off-road vehicle may be larger than the size of the first off-road vehicle. In some embodiments, the second vehicle may adjust the vehicle data and the map data to accurately reflect the vehicle size in the reproduction of the second vehicle. In addition, the process 300 can be applicable to vehicles from different manufactures.

In an example, according to a GPS or any suitable navigation system, a current location of the first vehicle 101 can be determined. Alternatively, a location and a corresponding vehicle data and map data for the location can be determined ahead of time (e.g., via GPS routing), and the vehicle data and the map data can be used when the first vehicle 101 is in proximity of the location or at the location. For example, the first vehicle is at the current location. The processing circuitry 130 can determine vehicle data and map data and to be used at a next location. When the first vehicle 101 is within proximity of the next location or reaches the next location, the first vehicle 101 can use the candidate camera view for the next location.

Figure 4:
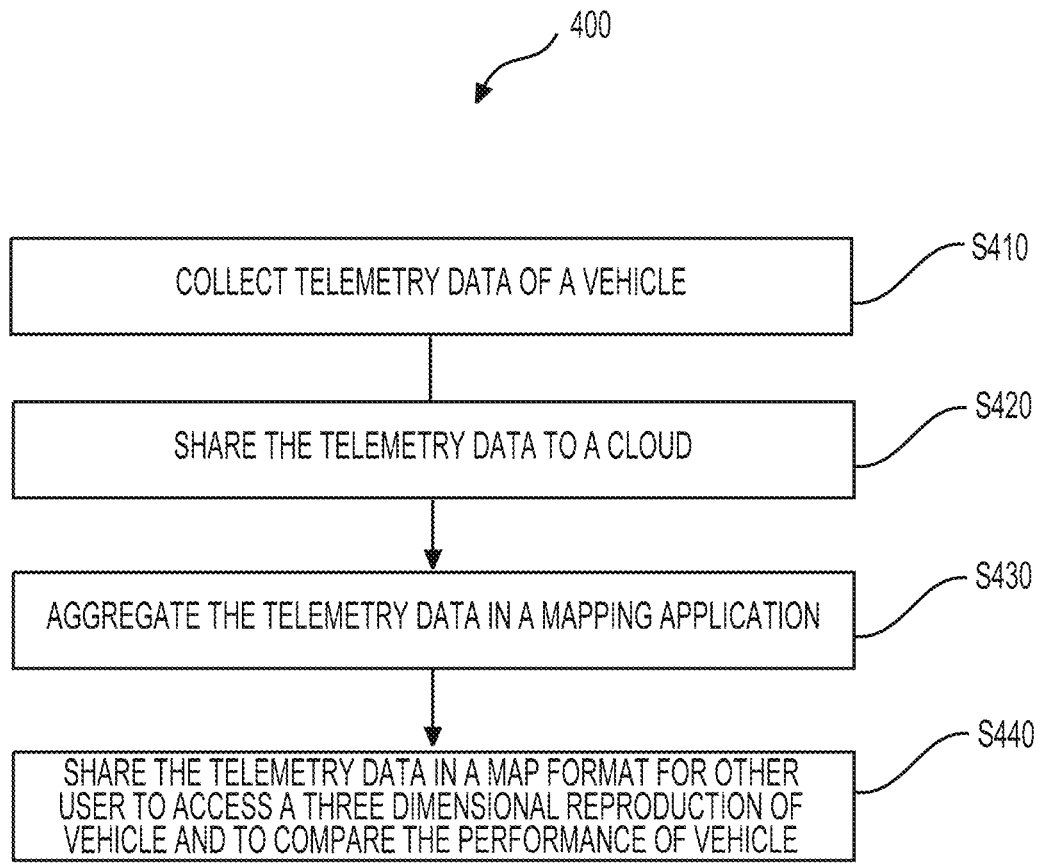
FIG. 4 is a flowchart outlining an exemplary process 400 according to an embodiment of the disclosure.

FIG. 4 is a flowchart outlining an exemplary process 400 according to an embodiment of the disclosure. In an example, the process 400 can be implemented using the system 100 shown in FIG. 1. In an embodiment, the process 400 can be used to share a reproduction of a first vehicle in a three-dimensional representation for another user in a second vehicle to compare performance of the vehicles. As described above, the first vehicle 101 can include the camera modules 110 and sensors 120 configured to collect telemetry data such as vehicle data and sensor data. The process 400 starts at S410 and proceeds to S440.

At S410, telemetry data of a first vehicle is collected. For example, the telemetry data may include map data and vehicle data of the first vehicle 101. The map data and the vehicle data of the first vehicle 101 can be collected by the camera modules 110 and the sensors 120 in FIG. 1, as described above.

In an embodiment, as described above, the second vehicle(s) can be within the certain distance threshold (e.g., 50 meters, 1 mile) from the first vehicle 101. The second vehicle(s) may have been or are in a first location where the first vehicle 101 is at or will be at. The one or more second vehicles can be used by other users.

At S420, telemetry data of the first vehicle is shared to a cloud. The telemetry data may be shared directly to a remote server or a cloud, or the telemetry data may be stored in a memory of the first vehicle followed by sharing the telemetry data in the memory to a remote server or a cloud.

In an example, telemetry data such as a user list having multiple users (e.g., a first user and a second user) and user information of the multiple users can be collected by camera modules 110 and sensors 120, and stored in the memory 140, a cloud, a server, and/or the like. The multiple users can include users of the first vehicle 101 and/or users of other vehicles. The cloud and/or the server can be specific to a manufacturer, can be shared among multiple manufacturers, or can be a public cloud/server.

In some embodiments, the telemetry data may be shared to a cloud, and other users in an area nearby the first vehicle may be viewed. The telemetry data may be limited to a certain group of users (e.g., friends), or a certain number of users. For example, the telemetry data may be limited to be accessed by 20 users maximum. In addition, the telemetry data may be limited to only be shared to coworkers in a same company.

In some embodiments, the telemetry data may be expanded to share to users in a defined location which is different than the current location where the first vehicle is. For example, the driver in the first vehicle 101 is currently driving in a city. The driver may define the telemetry data of the first vehicle to be shared to family members in another city to see the driver's current status.

At S430, the telemetry data is aggregated in a mapping application. As described above, the telemetry data may include map data and vehicle data of the first vehicle 101. The mapping application may be a navigation application. The mapping application can further use the GPS location in the vehicle data and the map data of the first vehicle to determine a map from the map data based on the GPS location. After locating the map from the map data, the telemetry data is aggregated in the mapping application.

At S440, the telemetry data in a map format is shared for another user to access a three-dimensional reproduction of the first vehicle 101. The other user can further compare a vehicle performance of the first vehicle to a vehicle performance of the second vehicle associated with the other user. For example, in S430, the telemetry data is aggregated in the mapping application, and the telemetry data is further overlapped to be a three-dimensional reproduction of the first vehicle 101. The other user in a second vehicle may access the three-dimensional reproduction of the first vehicle 101, for example, from the mapping application. The other user in the second vehicle may compare a performance of the first vehicle with the second vehicle based on the three-dimensional reproduction of the first vehicle 101 in the mapping application. The performance may be a vehicle speed of the first vehicle in certain road conditions (e.g., hills, mountains, etc.). The user may use one or more algorithms provided by the mapping application to calculate the result of the comparison of the vehicle performance. The one or more algorithm can be a machine learning model, or the like. The calculation of the performance of the vehicles can be performed in the private cloud or a public cloud, in a memory of the first vehicle 101, or in a memory of the second vehicle.

In some embodiments, the other user in the second vehicle may or may not have used the first vehicle 101. The other user may or may not be a driver of the second vehicle. The other user may or may not be a passenger of the second vehicle. The other user may or may not be a pedestrian, and the pedestrian may or may not be associated with the second vehicle.

The process 400 can be suitably modified. Step(s) can be added, omitted, and/or combined. An order of implementing steps in the process 400 can be adapted. In an example, a step can be added after S430 to display aggregated telemetry data on a display device. The display device may be on the second vehicle or on a device held by the other user. The other user may select different views to see the three-dimensional reproduction of the first vehicle such as a side view, a front view, or a bottom view.

Figure 5A:
FIG. 5A show an example of map data according to an embodiment of the disclosure.

FIG. 5A is a picture of map data. The picture shows a road condition of the first vehicle 101. The road information can be displayed from this picture showing the road condition. The picture may be taken when the first vehicle was driving. The picture may be a picture stored in a memory of the first vehicle. The picture can be obtained based on a GPS data in the first vehicle data as described above.

Figure 5B:
FIG. 5B show an example of a reproduction of a vehicle in a three-dimensional representation according to an embodiment of the disclosure.

FIG. 5B is a picture of a reproduction of a first vehicle 101. A picture of a first vehicle 101 (e.g., a truck image) and a picture of a road image (e.g., an off-road by a lake) may be used to reproduce the first vehicle 101. As described earlier in S330 in FIG. 3, the picture of the first vehicle 101 and the picture of the road image can be overlapped to reproduce the first vehicle, for example, the truck image by the lake in FIG. 5B. The vehicle image is not limited to the truck image in FIG. 5B only. The vehicle can be any types of vehicles. The road image can depend on a specific location where the first vehicle is located.

In some embodiments, the pictures of the first vehicle and road image may be tilted or rotated in order to be aligned correctly. In some embodiments, the reproduction of the vehicle is not limited to only one vehicle. It may include both the first vehicle 101 and a second vehicle in the reproduction, and the driver in the first vehicle and the second vehicle can access to the reproduction of these two vehicles. In some embodiments, there may be a third vehicle to be reproduced together with the first vehicle 101 and the second vehicle.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of reproducing a first off-road vehicle, comprising:

collecting, by one or more sensors of the first off-road vehicle and one or more sensors of a second off-road vehicle, vehicle data and map data;

adjusting, by processing circuitry, the vehicle data and the map data;

graphically reproducing the first off-road vehicle and the second off-road vehicle based at least in part on the adjusted vehicle data and the adjusted map data, the reproduction of the first off-road vehicle and the second off-road vehicle being a three-dimensional representation; and providing the reproduction of the first off-road vehicle as a three-dimensional representation to a driver of a second vehicle, and providing the reproduction of the second off-road vehicle as a three-dimensional representation to a driver of the first vehicle, wherein the driver of the second vehicle is different from a driver of the first off-road vehicle, wherein the driver of the first vehicle observes a first performance of the second off-road vehicle on a display device within the first vehicle based on the reproduction being in the three-dimensional representation based at least in part on the adjusted data collected by the sensors of the second off-road vehicle, and wherein the driver of the second vehicle observes a first performance of the first off-road vehicle on a display device within the second vehicle based on the reproduction being in the three-dimensional representation based at least in part on the adjusted data collected by the sensors of the first off-road vehicle.

2. The method of claim 1, further comprising storing the collected vehicle data and the collected map data for a set amount of time, the set amount of time being defined by a driver in the first off-road vehicle.

3. The method of claim 1, wherein the driver of the second vehicle compares the first performance of the first off-road vehicle with a second performance of the second vehicle based on the reproduction.

4. The method of claim 1, wherein the vehicle data includes at least one of: a vehicle speed, a wheel speed, a yaw angle, a tilt angle, a compass heading, an elevation, an altitude, a LIDAR data, a sonar data, or GPS coordinates information.

5. The method of claim 4, wherein the vehicle data further includes external data, the external data including at least one of: temperature, humidity, or air quality.

6. The method of claim 1, wherein the map data includes at least one of: a road image or a map image.

7. The method of claim 1, the vehicle data further includes data collected by one or more sensors of passengers in the first off-road vehicle.

8. The method of claim 1, further comprising sharing the reproduction to a threshold amount of users, the threshold being defined by a driver of the first off-road vehicle.

9. The method of claim 1, further comprising sharing the reproduction to one or more users in a distance less than a threshold amount of length from a location of the first off-road vehicle.

10. The method of claim 1, further comprising collecting data regarding at least the driver of the first off-road vehicle by at least one of one or more sensors and one or more cameras within the first off-road vehicle.

11. A system for reproducing a first off-road vehicle, comprising processing circuitry configured to:
collect, by one or more sensors of the first off-road vehicle and one or more sensors of a second off-road vehicle, vehicle data and map data;
adjust the vehicle data and the map data;
graphically reproduce the first off-road vehicle and the second off-road vehicle by the adjusted vehicle data and the adjusted map data, the reproduction of the first off-road vehicle and the second off-road vehicle being a three-dimensional representation; and
providing the reproduction of the first off-road vehicle as a three-dimensional representation to a driver of a second vehicle and providing the reproduction of the second off-road vehicle as a three-dimensional representation to a driver of the first vehicle, wherein the driver of the second vehicle is different from a driver of the first off-road vehicle,
wherein the driver of the first vehicle observes a first performance of the second off-road vehicle on a display device within the first vehicle based on the reproduction being in the three-dimensional representation based at least in part on the adjusted data collected by the sensors of the second off-road vehicle, and
wherein the driver of the second vehicle observes a first performance of the first off-road vehicle on a display device within the second vehicle based on the reproduction being in the three-dimensional representation based at least in part on the adjusted data collected by the sensors of the first off-road vehicle.

12. The system of claim 11, wherein the processing circuitry is further configured to store the collected vehicle data and the collected map data for a set amount of time, the set amount of time being defined by a driver in the first off-road vehicle.

13. The system of claim 11, wherein the driver of the second vehicle compares the first performance of the first off-road vehicle with a second performance of the second vehicle based on the reproduction.

14. The system of claim 11, wherein the vehicle data further includes external data, the external data including at least one of: temperature, humidity, or air quality.

15. The system of claim 11, wherein the map data includes at least one of: a road image or a map image.

16. The system of claim 11, wherein the vehicle data further includes data collected by one or more sensors of passengers in the first off-road vehicle.

17. A non-transitory computer readable storage medium having instructions stored thereon that when executed by processing circuitry causes the processing circuitry to perform a method, the method comprising:
collecting, by a sensor of a first off-road vehicle and a sensor of a second off-road vehicle, vehicle data and map data;
adjusting the vehicle data and the map data;
graphically reproducing the first off-road vehicle and the second off-road vehicle by the adjusted vehicle data and the adjusted map data, the reproduction of the first off-road vehicle and the second off-road vehicle being a three-dimensional representation; and
providing the reproduction of the first off-road vehicle as a three-dimensional representation to a driver of a second vehicle and providing the reproduction of the second off-road vehicle as a three-dimensional representation to a driver of the first vehicle, wherein the driver of the second vehicle is different from a driver of the first off-road vehicle,
wherein the driver of the first vehicle observes a first performance of the second off-road vehicle on a display device within the first vehicle based on the reproduction being in the three-dimensional representation based at least in part on the adjusted data collected by the sensors of the second off-road vehicle, and
wherein the driver of the second vehicle observes a first performance of the first off-road vehicle on a display device within the second vehicle based on the reproduction being in the three-dimensional representation based at least in part on the adjusted data collected by the sensors of the first off-road vehicle.

* * * * *